H. OPGENORTH.
BELT REPLACER.
APPLICATION FILED JAN. 29, 1913.

1,072,641.

Patented Sept. 9, 1913.
2 SHEETS—SHEET 1.

Witnesses
W. S. McDowell
Dudley B. Howard

Inventor
Henry Opgenorth.
By Victor J. Evans
Attorney

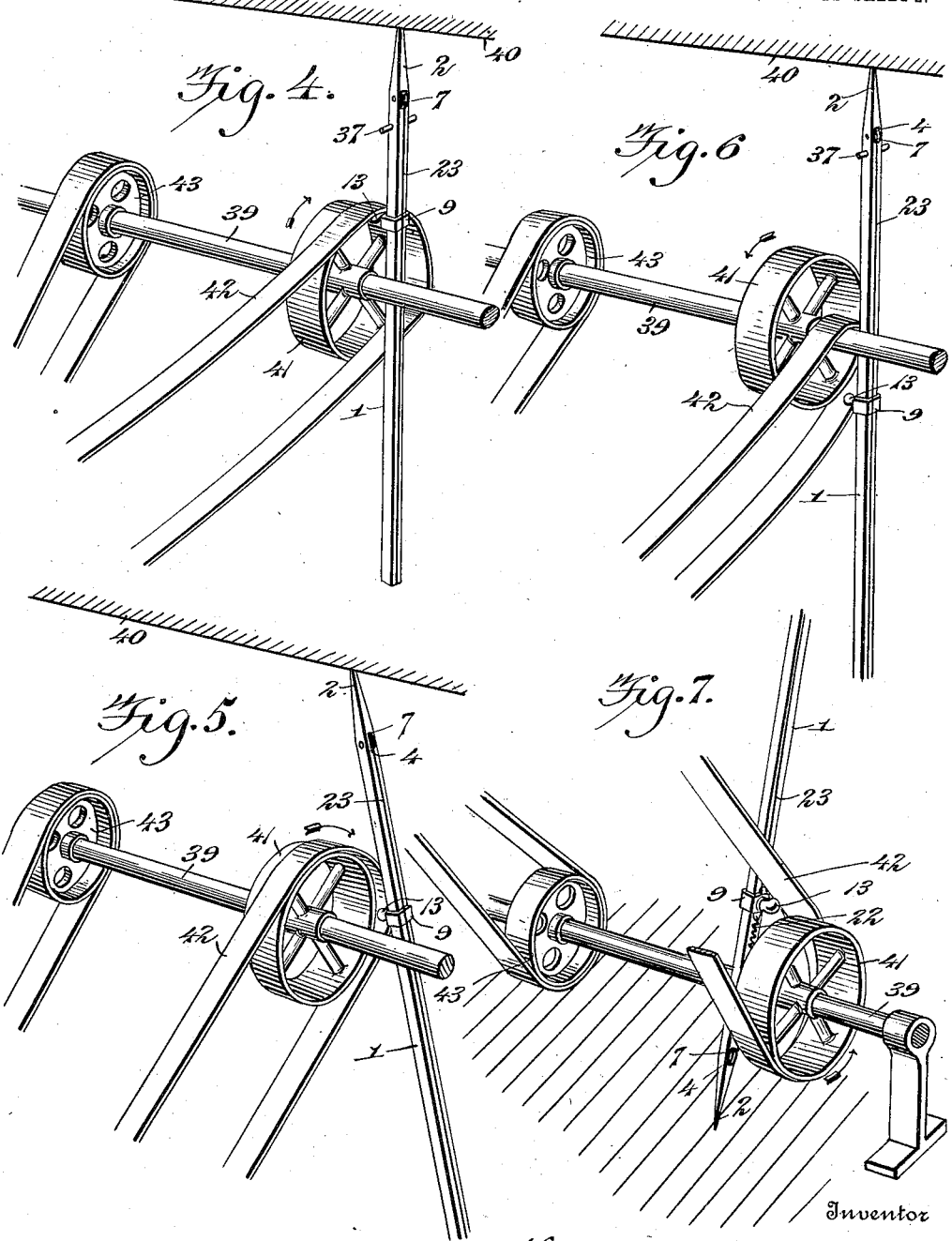

UNITED STATES PATENT OFFICE.

HENRY OPGENORTH, OF SHEBOYGAN, WISCONSIN.

BELT-REPLACER.

1,072,641.  Specification of Letters Patent.  Patented Sept. 9, 1913.

Application filed January 29, 1913. Serial No. 744,940.

*To all whom it may concern:*

Be it known that I, HENRY OPGENORTH, a citizen of the United States, residing at Sheboygan, in the county of Sheboygan and State of Wisconsin, have invented new and useful Improvements in Belt-Replacers, of which the following is a specification.

This invention relates to a belt replacer which is adapted to be used in replacing belts upon the pulleys from which they have become disengaged, the primary object thereof being to provide a device of this character which will be very efficient in operation, which is very light and simple in construction so that it may be easily operated and manufactured at a small cost, and which may be operated without danger to the operator.

Figure 1:
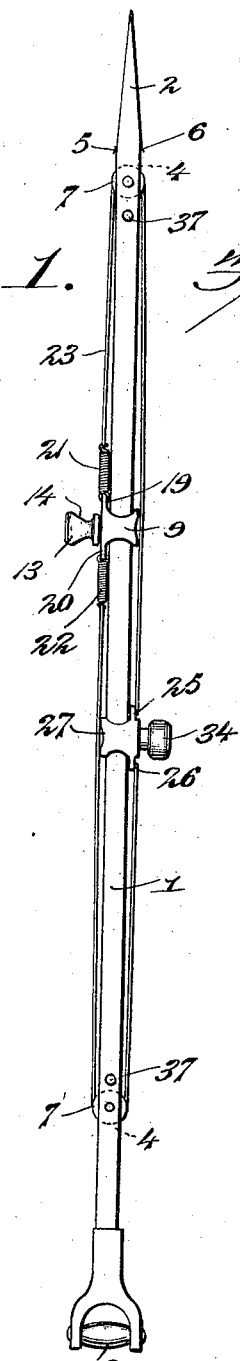
Figure 2:
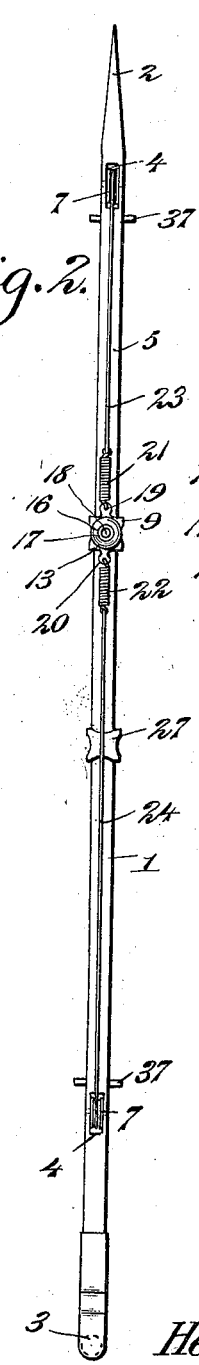
Figure 3:
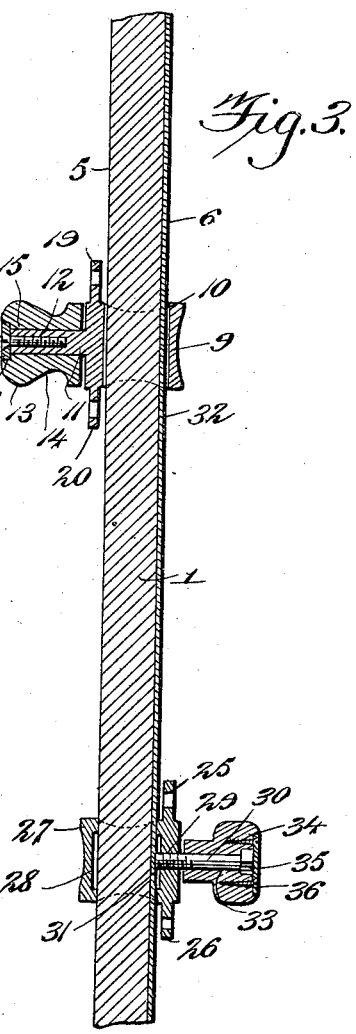

The invention consists in the features of construction, combination and arrangement of parts, hereinafter fully described and claimed, reference being had to the accompanying drawings, in which:

Figure 1 is a side elevation of the device; Fig. 2 is a front elevation thereof; Fig. 3 is a longitudinal sectional view taken therethrough; Fig. 4 is a perspective view of the device in use in forcing a belt onto an overhead pulley revolving in clockwise direction, the uppermost follower spring being under tension; Fig. 5 is a similar view showing the device after the throwing of the belt has been effected, the spring being in normal position; Fig. 6 is a similar view of the device in use for replacing a belt upon an overhead pulley rotating in counterclockwise direction, the lowermost follower spring being under tension; and, Fig. 7 is a similar view showing the device in use in replacing a belt upon a pulley located at a lower level than the position of the operator, the said pulley being rotatable in clockwise direction.

Referring to the drawings, and in particular to Figs. 1, 2, and 3, the numeral 1 designates the body of the belt replacer, which is in the form of a rod rectangular in cross section, and which is constructed preferably of some light material such as wood, or the like. The length of this body depends upon the requirements of usage. When the device is intended for use in shops, wherein the belts and pulleys are suspended from high ceilings, the body 1 of each replacer is of considerable length. The body 1 is provided at one end with a pointed engaging member 2, which is intended for a purpose to be described more fully hereinafter. A handle 3 is secured to the opposite end of the body, and the said body is provided adjacent each end with a slot 4 opening through the side faces 5 and 6 of the body. A grooved pulley wheel 7 is rotatably mounted in each slot 4 upon a transverse pintle. A slidable belt supporting member 9 is mounted upon the body 1, with its rectangular opening 10 receiving the said body. This member 9 is provided upon the side thereof corresponding to the side face 5 of the body 1 with a lateral stub shaft 11 having a threaded recess 12 in its outer end. A belt engaging roller 13 provided with an external, peripheral groove 14, is provided with a longitudinal opening 15 for the reception of the shaft 11, so that the said roller may be mounted rotatably thereon. The roller 13 is provided in its outer end face with a circular recess 16 adapted to receive a circular retainer plate 17, which latter is secured to the end of the shaft 11 by means of a threaded securing member 18 received within the shaft recess 12. Eye members 19 and 20 are formed on the upper and lower edges of the member 9 on the same side as the roller 13, and helical operating springs 21 and 22 have their adjacent ends secured to the eye members 19 and 20 respectively. The opposite ends of these springs are attached to flexible cords 23 and 24, each of which extends outwardly along the side face 5 of the body 1 and through the adjacent slot 4, passing around the pulley wheel 7 mounted therein. The cords 23 and 24 then extend inwardly along the opposite side face 6 of the said body to their points of attachment with the eye members 25 and 26 respectively, provided upon the adjustable member 27, which is slidably mounted upon the body 1 with its rectangular opening 28 receiving the same. The member 27 is provided in the side portion thereof corresponding to the side face 6 of the body 1 with a threaded opening 29, in which is adjustably mounted a threaded bolt member 30 whose inner engaging end 31 is adapted to engage the said side face of the body 1. In order to prevent marring of the said side face 6 of the body, it is necessary to provide a longitudinally extending metal strip 32 which is inlaid in the said face and extends in the path of movement of the engaging end 31 of the bolt 30 for a suitable distance, depending upon the extreme length of movement of the operating member 27. The bolt member 30 has its outer portion mounted within an opening 33 provided within a rotatable handle 34, the head 35 of the said bolt member being countersunk within the handle. A retainer plate 36 is attached in suitable manner to the outer end face of the handle so as to close the countersunk opening 33. A laterally projecting member 37 is provided in the body 1 adjacent each slot 4, inwardly with respect thereto.

In Figs. 4 to 7 inclusive, I have shown the device put to various uses. In order to replace a belt upon an overhead pulley as shown particularly, in Figs. 4 and 5, the replacer is thrust upwardly so that the roller 13 will be brought into engagement with the outer side edge of the belt 38 above the line shaft 39, the pointed engaging member 32 being inserted into the ceiling, or hanger plank 40 adjacent the pulley 41 upon which the belt is to be mounted. Then the operating handle 34 is grasped and pulled downwardly, so as to draw the member 27 in this direction and thus exert a pull upon the flexible cord 23. This will cause the belt to be elevated so that the upper portion thereof will become engaged with the upper portion of the pulley 41, and the uppermost spring 21 will be placed under tension. Then by a slight turn of the hand grasping the handle 34, the member 27 may be secured against movement. By swinging the body of the device away from the shaft 39, while the pulley 41 is rotating in the direction of the arrow, the belt 42 will be caused to climb onto the pulley, the follower spring 21 serving to aid in this operation by boosting the belt upwardly as the roller 13 is forced outwardly. In Fig. 6 the operation is practically the same, except that the operating roller 13 is engaged with the belt beneath the line shaft 39, it being understood that it is necessary in this instance to rotate the pulley 41 in counterclockwise direction, as necessitated probably by the kind of machinery connected to the line shaft. In Fig. 7, the device is shown positioned for use in replacing a belt upon a pulley disposed below the operator's position, wherein the engaging member 2 is inserted in the floor, or whatever support is provided for the shaft bearing. In this instance, the operating handle should be operated in the direction of the engaging point, so as to draw the roller 13 upwardly into engagement with the proper portion of the belt. In this figure, the pulley wheel is shown as rotatable in clockwise direction, but it is to be understood that the operation of the device is similar in placing a belt upon a pulley which must necessarily rotate in either direction, with the exception of the initial positioning or inclination of the replacer body itself, so as to bring the operating roller into engagement with the proper portion of the belt. After the operating roller has been moved through the medium of the cord 24 and the spring 22 so as to bring the belt into initial engagement with the pulley and to cause the said spring to be placed under tension, the handle 34 is rotated so as to lock the member 27 upon the body 1. Rotation of the pulley in the proper direction will permit the spring to act in boosting the belt as it climbs upon the pulley.

From the foregoing description, taken in connection with the accompanying drawings, it will be seen that I have provided a belt replacer which may be readily and efficiently operated by one person, two hands being required in the initial operation of the device, and the use of one han dalone after the operating member has been locked. The device is very simple in construction, and cannot readily get out of order, thus presenting a structure which may be manufactured at a very low cost, so as to bring the same within the reach of everyone who may have occasion to use such a device, thus presenting to the different mechanical trades a device which will prevent the danger and annoyance ordinarily incident with the replacing of belts upon pulleys, with especial reference to pulleys which must necessarily be rotated by power means while applying the belt.

What is claimed is:

1. A device of the class described comprising an elongated body, a pointed engaging member provided upon one end of said body adapted for engagement with a stationary support, a supporting member slidably mounted upon said body for longitudinal movement, belt engaging means provided upon said supporting member, and means by which said supporting member may be operated.

2. A device of the class described comprising an elongated body, an engaging member provided upon one end of said body, a supporting member slidably mounted upon said body for longitudinal movement, belt engaging means carried by said supporting member, an operating member movably mounted upon said body and operatively associated with the supporting member, said operating member adapted to be manually operated to impart movement to the supporting member, means for locking said operating member after the initial operation thereof, and means connected with the supporting member for causing additional movement thereof as the belt passes onto the pulley.

3. A device of the class described comprising an elongated body, an engaging member provided upon one end of said body, a supporting member slidably mounted upon said body for longitudinal movement, belt engaging means carried by said supporting member, an operating member movably mounted upon said body and operatively associated with the supporting member, said operating member adapted to be manually operated to impart movement to the supporting member, means for locking said operating member after the initial operation thereof, and resilient means for causing additional operation of the supporting member as the belt climbs onto the pulley.

4. A device of the class described comprising an elongated body, an engaging member on one end of the said body, a grooved pulley wheel rotatably mounted adjacent each end thereof, a supporting member slidably mounted upon said body for longitudinal movement, belt engaging means carried by said member, an operating member slidably mounted upon said body in spaced relation to the supporting member, means by which said operating member may be locked in adjusted positions upon said body, a handle provided upon said locking means, and helical extensile springs having their adjacent ends attached to the opposite ends of the supporting member, and a pair of flexible cords connecting the opposite ends of said springs with the opposite ends of the operating member, said cords passing around the said pulleys.

In testimony whereof I affix my signature in presence of two witnesses.

HENRY OPGENORTH.

Witnesses:
 FRED WILKE,
 FRANK GROH.

Copies of this patent may be obtained for five cents each, by addressing the "Commissioner of Patents, Washington, D. C."